R. W. H. CRABB.
APPARATUS FOR USE IN MAKING CANDY.
APPLICATION FILED NOV. 11, 1909.

972,511.

Patented Oct. 11, 1910.
2 SHEETS—SHEET 1.

Witnesses
F. Gertrude Tallman
L. G. Greenfield

Inventor
Roy W. H. Crabb
By Chappell & Earl
Attorneys

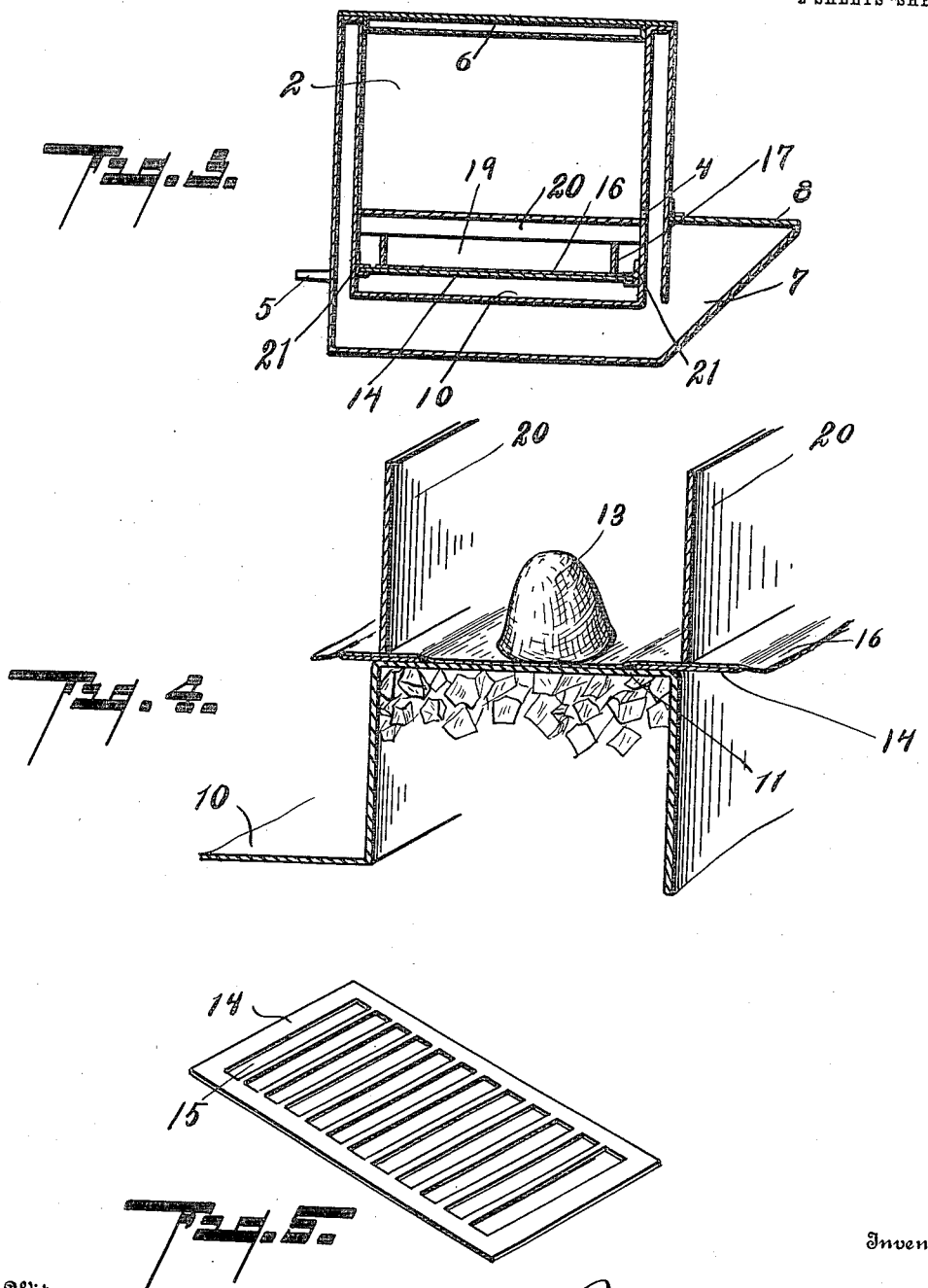

UNITED STATES PATENT OFFICE.

ROY W. H. CRABB, OF BATTLE CREEK, MICHIGAN.

APPARATUS FOR USE IN MAKING CANDY.

972,511.  Specification of Letters Patent.  Patented Oct. 11, 1910.

Application filed November 11, 1909. Serial No. 527,514.

*To all whom it may concern:*

Be it known that I, ROY W. H. CRABB, a citizen of the United States, residing at the city of Battle Creek, county of Calhoun, State of Michigan, have invented certain new and useful Improvements in Apparatus for Use in Making Candy, of which the following is a specification.

This invention relates to improvements in apparatus for use in making candy.

The main objects of this invention are: First, to provide an improved apparatus for use in making candy by the aid of which chocolate coated candies may be satisfactorily manufactured in a warm room. Second, to provide an improved apparatus for use in making chocolate coated candies by the aid of which the candy may be satisfactorily cooled so as to give it the desired high gloss finish. Third, to provide an improved apparatus for use in making chocolate coated candy which enables the manufacturing of such candy rapidly and economically. Fourth, to provide an improved apparatus for use in making chocolate coated candies which is very simple and economical in structure, and occupies but little space, so that it may be used by an operator in such places as a candy store or the like.

Further objects, and objects relating to structural details will definitely appear from the detailed description to follow.

I accomplish the objects of my invention by the devices and means described in the following specification.

The structure described constitutes one effective embodiment of my invention. Other embodiments would be readily devised by those skilled in the art.

The invention is clearly defined and pointed out in the claims.

Figure 1:
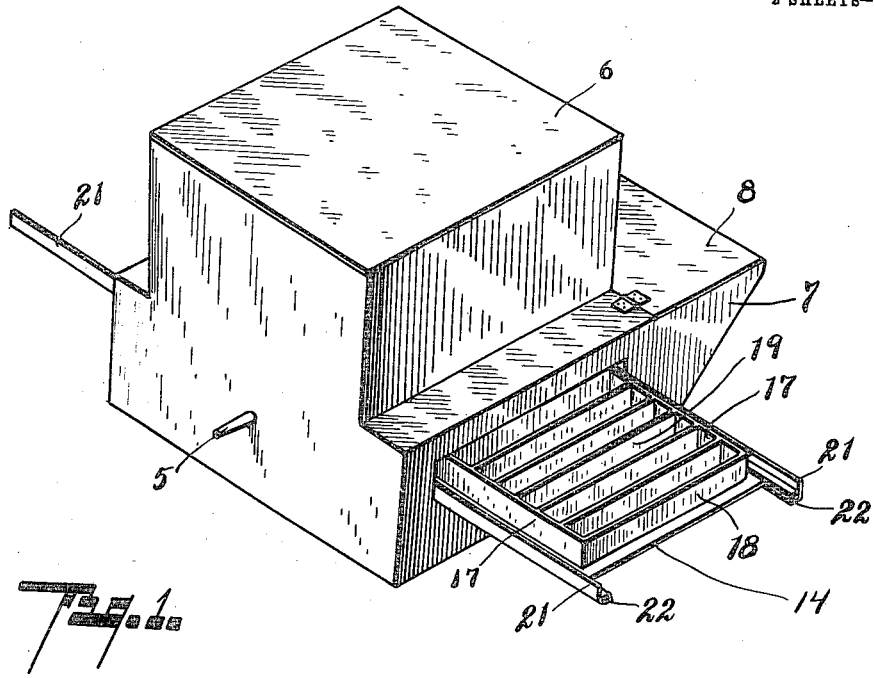
Figure 2:
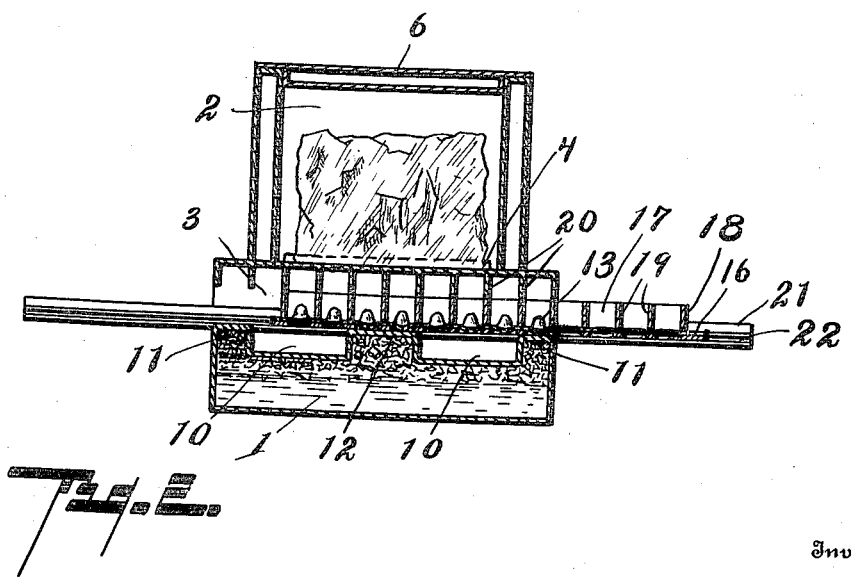

A structure constituting an effective and preferred embodiment of the features of my invention is clearly illustrated in the accompanying drawing, forming a part of this specification, in which:

Figure 1 is a perspective view of a structure embodying the features of my invention. Fig. 2 is a vertical central section of the structure appearing in Fig. 1 from front to rear. Fig. 3 is a transverse vertical section. Fig. 4 is an enlarged detail view showing one of the raised ice compartments of the lower ice chamber, and details of the tray, a piece of candy being shown in the tray. Fig. 5 is a perspective view of the tray bottom.

In the drawings, similar reference characters refer to similar parts throughout the several views, and the sectional views are taken looking in the direction of the little arrows at the ends of the section lines.

Referring to the drawings, my improved apparatus preferably consists of a lower ice chamber 1, an upper ice chamber 2, and a cooling chamber 3 disposed between the same. The cooling chamber is preferably open at the front and rear to admit the trays on which the candies to be cooled are placed. The ice chamber 2 is preferably double-walled as illustrated, and is preferably provided with a discharge or drip opening 4 which delivers to the lower ice chamber, the lower ice chamber being provided with a discharge or drip spout 5, see Fig. 1.

The upper ice chamber is preferably provided with a cover 6, through which the ice is introduced. The lower ice chamber is preferably provided with a hopper 7 at one end, the same projecting beyond the upper ice chamber and being provided with a lid or cover 8. The bottom of the upper ice chamber and the top of the lower ice chamber are preferably arranged to form the top and bottom, respectively, of the cooling chamber. The top 10 of the lower ice chamber is provided with raised portions 11 and 12 which form raised ice compartments extending transversely across the cooling chamber. These raised ice compartments are preferably disposed at the front and rear, and centrally of the cooling chamber as clearly appears in Fig. 2. By providing the hopper 7 at one end of the lower ice chamber, these compartments 11 and 12 are readily filled with cracked ice. The cooling chamber preferably projects at the front and rear of the upper ice chamber, as illustrated, the advantage of which will be explained later.

The confections, as 13, to be cooled, are placed on a tray and passed through the cooling chamber. This tray preferably consists of a bottom 14 having transverse slot-like openings 15 therein. On this bottom I arrange a false bottom 16 of paper, which supports the candies over the openings 15 in the bottom. The walls of the tray are preferably removable and consist of the side walls 17, end walls 18, and partitions 19, the partitions being arranged or spaced so as to come between the openings 15 of the bottom.

The cooling chamber is preferably provided with a series of partitions 20 which depend from the top of the cooling chamber, the partitions being spaced to correspond to the partitions of the tray, so that as the trays are advanced through the cooling chamber with a step by step movement, a series of cooling compartments are provided. Ways 21 are preferably provided for the trays, the ways having grooves 22 to receive the edges of the trays as clearly appears from the drawing. These ways are preferably extended at each side of the cooling chamber for the convenience in supporting the trays as they are introduced and taken from the apparatus.

In use the candies are dipped and placed in the first compartment of the tray. When this compartment is filled the tray is advanced one step into the cooling chamber. As the tray is advanced into the cooling chamber the bottom of the chocolates are first cooled by coming into contact with the cooling surface of the first raised ice compartment of the lower ice chamber. The openings in the bottom of the tray allow the paper to rest on the top of the raised ice compartment which forms an effective cooling surface. As the tray is advanced with the step by step movement the candies are brought into the cooling chamber and effectively cooled and a high gloss finish is secured. The raised ice compartment at the rear is preferably provided as it insures the complete cooling of the chocolates. I desire to remark in this connection that difficulty has been found in the securing of the gloss finish on the base of chocolate coated candies, even in expensive cooling rooms, on account of the tops of the candies cooling quicker than the bottoms, which is occasioned by the thickness of the candies preventing the chocolate on the bottom cooling at the same time as on the top.

By the use of my improved cooling apparatus the cooling of the bottom of the chocolates is made effective as they are, when introduced into the cooling chamber, brought into contact with an effective cooling surface. Further, by thus cooling the bottom of the chocolates they may be readily removed from the false bottom on which they are placed, and do not adhere thereto. This false bottom is preferably provided with a suitable design or other matter as desired, so that the candies are effectively marked during the cooling operation.

My improved apparatus is not only convenient to use, but is very economical both in the matter of first cost and the consumption of ice. It can be effectively used in a warm room thus avoiding the necessity of cooling the room, and permitting its use, if desired, in view of the public.

I have illustrated and described my improvements in detail in the form preferred by me on account of structural simplicity and economy thereof, and the convenience in operation. I am, however, aware that they are capable of considerable variation in structural details without departing from my invention, and I desire to be understood as claiming the same specifically, as illustrated, as well as broadly.

Having thus described my invention, what I claim as new and desire to secure by Letters Patent is:

1. The combination of an upper and lower ice chamber; a cooling chamber disposed between said ice chambers, the bottom of said upper ice chamber and the top of said lower ice chamber forming the top and bottom, respectively, of said cooling chamber, the top of said lower ice chamber having transverse raised ice compartments disposed centrally and at the front and rear thereof, said cooling chamber being extended beyond the front and rear of said upper ice chamber; a tray adapted to be passed through said cooling chamber, said tray comprising a bottom having transverse slot-like openings therein, a false bottom of paper arranged thereon to support the candy to be cooled over said openings in said bottom, said tray bottom resting on the said raised ice compartments of said cooling chamber bottom as the tray is passed through the cooling chamber, walls for said tray having a plurality of transverse partitions arranged between the openings of said bottom; and partitions depending from the top of said cooling chamber, said partitions being arranged transversely of said ways and being spaced to correspond with the partitions of said tray walls whereby a series of cooling compartments are provided as the tray is passed through said cooling chamber.

2. The combination of an upper and lower ice chamber; a cooling chamber disposed between said ice chambers, the bottom of said upper ice chamber and the top of said lower ice chamber forming the top and bottom, respectively, of said cooling chamber, the top of said lower ice chamber having transverse raised ice compartments disposed at the front and rear thereof, said cooling chamber being extended beyond the front and rear of said upper ice chamber; a tray adapted to be passed through said cooling chamber, said tray comprising a bottom having transverse slot-like openings therein, a false bottom of paper arranged thereon to support the candy to be cooled over said openings in said bottom, said tray bottom resting on the said raised ice compartments of said cooling chamber bottom as the tray is passed through the cooling chamber, walls for said tray having a plurality of transverse partitions arranged between the openings of said bottom; and partitions depending from the top of said cooling chamber, said partitions being arranged transversely of said ways and being spaced to correspond with the partitions of said tray walls whereby a series of cooling compartments are provided as the tray is passed through said cooling chamber.

3. The combination of an upper and a lower ice chamber; a cooling chamber disposed between said ice chambers, the bottom of said upper ice chamber and the top of said lower ice chamber forming the top and bottom, respectively, of said cooling chamber, the top of said lower ice chamber having transverse raised ice compartments disposed centrally and at the front and rear thereof; and a tray adapted to be passed through said cooling chamber, said tray comprising a bottom having transverse slot-like openings therein, a false bottom of paper arranged thereon to support the candy to be cooled over said openings in said bottom, said tray bottom resting on the said raised ice compartments of said lower ice chamber as the tray is passed through the cooling chamber.

4. The combination of an upper and a lower ice chamber; a cooling chamber disposed between said ice chambers, the bottom of said upper ice chamber and the top of said lower ice chamber forming the top and bottom, respectively, of said cooling chamber, the top of said lower ice chamber having transverse raised ice compartments disposed at the front and rear thereof; and a tray adapted to be passed through said cooling chamber, said tray comprising a bottom having transverse slot-like openings therein, a false bottom of paper arranged thereon to support the candy to be cooled over said openings in said bottom, said tray bottom resting on the said ice compartments of said lower ice chamber as the tray is passed through the cooling chamber.

5. The combination of an upper and a lower ice chamber; a cooling chamber disposed between said ice chambers, the bottom of said upper ice chamber and the top of said lower ice chamber forming the top and bottom, respectively, of said cooling chamber, the top of said lower ice chamber having transverse raised ice compartments disposed centrally and at the front and rear thereof; and a tray to be passed through said cooling chamber.

6. The combination of an upper and a lower ice chamber; a cooling chamber disposed between said ice chambers, the bottom of said upper ice chamber and the top of said lower ice chamber forming the top and bottom, respectively, of said cooling chamber, the top of said lower ice chamber having transverse raised ice compartments disposed at the front and rear thereof; and a tray adapted to be passed through said cooling chamber.

7. The combination of an upper and a lower ice chamber; a cooling chamber disposed between said ice chambers, the bottom of said upper ice chamber and the top of said lower ice chamber forming the top and bottom respectively, of said cooling chamber, the top of said lower ice chamber having transverse raised ice compartments disposed centrally and at the front and rear thereof, said cooling chamber being extended beyond the front and rear of said upper ice chamber, said upper ice chamber being provided with a drip opening delivering to said lower ice chamber; a feed hopper at one end of said lower ice chamber, said feed hopper being extended beyond said upper ice chamber; and a tray adapted to be passed through said cooling chamber.

8. The combination of an upper and a lower ice chamber; a cooling chamber disposed between said ice chambers, the bottom of said upper ice chamber and the top of said lower ice chamber forming the top and bottom, respectively, of said cooling chamber, the top of said lower ice chamber having transverse raised ice compartments disposed at the front and rear thereof, said cooling chamber being extended beyond the front and rear thereof, said cooling chamber being extended beyond the front and rear of said upper ice chamber, said upper ice chamber being provided with a drip opening delivering to said lower ice chamber; a feed hopper at one end of said lower ice chamber, said feed hopper being extended beyond said upper ice chamber; and a tray adapted to be passed through said cooling chamber.

9. The combination of an upper and a lower ice chamber; a cooling chamber disposed between said ice chambers, the bottom of said upper ice chamber and the top of said lower ice chamber forming the top and bottom, respectively, of said cooling chamber, the top of said lower ice chamber having transverse raised ice compartments disposed at the front and rear thereof, said cooling chamber being extended beyond the front and rear of said upper ice chamber; and a tray adapted to be passed through said cooling chamber.

10. The combination of an upper and a lower ice chamber; a cooling chamber disposed between said ice chambers; ways arranged through said cooling chamber; a tray adapted to be passed through said cooling chamber on said ways, said tray comprising a bottom having transverse slot-like openings therein, a false bottom of paper arranged thereon to support the candy to be cooled over said openings in said bottom, said ways being arranged so that said tray bottom rests on the top of said lower ice chamber as the tray is passed through the cooling chamber, walls for said tray having a plurality of transverse partitions arranged between the openings of said bottom; and partitions depending from the top of said cooling chamber, said partitions being arranged transversely of said ways and being spaced to correspond with the partitions of said tray walls whereby a series of cooling compartments are provided as the tray is passed through said cooling chamber.

11. The combination of an upper and a lower ice chamber; a cooling chamber disposed between said ice chambers, said upper ice chamber being provided with a drip opening delivering to said lower ice chamber; a feed hopper at one end of said lower ice chamber, said feed hopper being extended beyond said upper ice chamber; ways arranged through said cooling chamber; and a tray adapted to be passed through said cooling chamber on said ways, said tray comprising a bottom and end walls, having a plurality of transverse sections.

12. The combination of an upper and a lower ice chamber; a cooling chamber disposed between said ice chambers; a tray adapted to be passed through said cooling chamber, said tray comprising a bottom having transverse slot-like openings therein, a false bottom of paper arranged thereon to support the candy to be cooled over said openings in said bottom, walls for said tray having a plurality of transverse partitions arranged between the openings of said bottom; and partitions depending from the top of said cooling chamber, said partitions being arranged transversely of said ways and being spaced to correspond with the partitions of said tray walls whereby a series of cooling compartments are provided as the tray is passed through said cooling chamber.

13. The combination of an upper and lower ice chamber; a cooling chamber disposed between said ice chambers; a tray adapted to be passed through said cooling chamber, said tray comprising a bottom and walls having a plurality of transverse partitions arranged between the openings of said bottom; and partitions depending from the top of said cooling chamber, said partitions being arranged transversely of said ways and being spaced to correspond with the partitions of said tray walls whereby a series of cooling compartments are provided as the tray is passed through said cooling chamber.

14. The combination of a cooling chamber; an ice chamber arranged above and below said cooling chamber; a tray adapted to be passed through said cooling chamber, said ice chamber being provided with a cooling surface for the tray bottom as it is introduced into the cooling chamber, the tray being provided with a plurality of transverse partitions and the cooling chamber being provided with correspondingly spaced partitions whereby a series of cooling compartments are provided as the tray is advanced through the cooling chamber.

15. The combination of a cooling chamber; an ice chamber arranged above and below said cooling chamber; and a tray adapted to be passed through said cooling chamber, said ice chamber being provided with a cooling surface for the tray bottom as it is introduced into the cooling chamber.

16. The combination of a cooling chamber; and a tray adapted to be passed through said cooling chamber, there being a cooling surface for the bottom of said tray as it is introduced into the cooling chamber, the tray being provided with a plurality of transverse partitions and the cooling chamber being provided with correspondingly spaced partitions whereby a series of cooling compartments are provided as the tray is advanced through the cooling chamber.

17. The combination of a cooling chamber; and a tray adapted to be passed through said cooling chamber, there being a cooling surface for the bottom of said tray as it is introduced into the cooling chamber.

In witness whereof, I have hereunto set my hand and seal in the presence of two witnesses.

ROY W. H. CRABB. [L. S.]

Witnesses:
BURRITT HAMILTON,
H. H. DOUGLAS.